United States Patent
Ohashi

(10) Patent No.: US 7,733,374 B2
(45) Date of Patent: Jun. 8, 2010

(54) IMAGE PICKUP DEVICE AND SUBSTRATE MOUNTING APPARATUS FOR AN ELECTRONIC PART

(75) Inventor: Yukihiko Ohashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1137 days.

(21) Appl. No.: 11/068,914

(22) Filed: Mar. 2, 2005

(65) Prior Publication Data

US 2006/0092308 A1 May 4, 2006

(30) Foreign Application Priority Data

Oct. 29, 2004 (JP) .............................. 2004-316406

(51) Int. Cl.
*H04N 5/225* (2006.01)
*H04N 7/18* (2006.01)
*H04N 9/07* (2006.01)

(52) U.S. Cl. .................... 348/207.99; 348/87; 348/337; 348/373

(58) Field of Classification Search ................. 348/87, 348/126, 335, 337, 207.99; 228/1.1, 105, 228/110.1; 382/151; 356/399, 400
See application file for complete search history.

(56) References Cited

U.S. PATENT DOCUMENTS

| | | | | |
|---|---|---|---|---|
| 5,457,538 A | * | 10/1995 | Ujiie | 348/87 |
| 5,884,831 A | * | 3/1999 | Sato et al. | 228/49.5 |
| 5,903,662 A | * | 5/1999 | DeCarlo | 382/151 |
| 6,168,063 B1 | * | 1/2001 | Sato et al. | 228/1.1 |
| 7,222,774 B2 | * | 5/2007 | Haji | 228/112.1 |
| 2004/0169762 A1 | * | 9/2004 | Imoto | 348/340 |

FOREIGN PATENT DOCUMENTS

| | | |
|---|---|---|
| CN | 2146008 Y | 11/1993 |
| CN | 1174404 A | 2/1998 |
| JP | 10-022308 | 1/1998 |
| JP | 11-330119 | * 11/1999 |

* cited by examiner

*Primary Examiner*—Nhan T Tran
(74) *Attorney, Agent, or Firm*—Fujitsu Patent Center

(57) ABSTRACT

An image pickup device includes: a prism ii including light entrance holes (16, 16) and a light exit hole (17) for exiting incident light by refracting the incident light from the light entrance holes (16, 16) and; a lens (12) located on a light exit hole (17) side of the prism (11); a camera (13) located on an opposite side to the prism (11) with respect to the lens (12), and a base (14) that supports the prism (11), the lens (12), and the camera (13). The light exit hole (16) of the prism (11), the lens (12), and the camera (13) are arranged on the same optical axis (10). Any one or both of the prism (11) and the lens (12) and/or the lens (12) and the camera (13) are separated from each other.

10 Claims, 4 Drawing Sheets

IMAGE PICKUP DEVICE AND SUBSTRATE MOUNTING APPARATUS FOR AN ELECTRONIC PART

BACKGROUND OF THE INVENTION

The present invention relates to an image pickup device suitable to mount a flip-chip type electronic part on a substrate and a substrate mounting apparatus for an electronic part.

Background Art

Generally, a positional displacement detecting apparatus is provided in a substrate mounting apparatus for mounting the electronic part on the substrate in order to detect a positional displacement between a substrate and an electronic part with a state in which the substrate is opposed to the electronic part immediately before the electronic part is mounted on the substrate.

In conventional positional displacement detecting apparatuses, there is an apparatus using an image pickup device composed of a camera. The image pickup device includes: a prism in which two light entrance holes are located at positions apart from each other by 180 degrees on a circumference and lights incident on the light entrance holes are refracted 90 degrees and exited from the light exit holes; a lens; a camera; and a base for supporting these members with a state in which they are arranged on the same optical axis.

The image pickup device is constructed such that an image of the substrate and an image of the electronic part from two light entrance holes of the prism injected at different timings are picked up by the camera, these pieces of image pickup data are compared with each other to detect the positional displacement between the substrate and the electronic part. (See, for example, JP 10-22308 A).

SUMMARY OF THE INVENTION

However, the conventional image pickup device has a problem in which respective portions are deformed by heat generated from an object to be picked up or the camera in which the light entrance holes of the prism are located closely, thereby deteriorating image pickup accuracy.

In a substrate mounting apparatus using the conventional image pickup device as a positional displacement detecting device, the image pickup accuracy of the image pickup device is low as described above. Therefore, detection accuracy of the positional displacement between the substrate and the electronic part is low, so that the quality of a product is likely to deteriorate.

The present invention has been made in view of such problems and has an object to provide an image pickup device capable of suppressing heat deformation of the respective portions even when a temperature of an object to be picked up or a camera is high, thereby improving the image pickup accuracy, and a substrate mounting apparatus for electrical part, which can detect the positional displacement between the substrate and the electronic part with high accuracy.

In order to solve the problems, the following device are employed in the present invention.

(1) That is, an image pickup device according to present invention includes: a prism including a light entrance hole and a light exit hole for exiting incident light by refracting the incident light from the light entrance hole and; a lens located on a light exit hole side of the prism; a camera located on an opposite side to the prism with respect to the lens; and a base that supports the prism, the lens, and the camera, the light exit hole of the prism, the lens, and the camera being arranged on the same optical axis.

The any one or both of the prism and the lens and/or the lens and the camera are separated from each other.

A material having a low linear expansion coefficient, such as an invar material (Ni array) is used for the base, so that the image pickup accuracy can be further improved.

According to the present invention, any one or both of the prism and the lens and/or the lens and the camera are separated from each other, so that it is possible to suppress heat transfer between the separated prism and lens or between the separated lens and camera.

Therefore, even when the prism located close to the object to be picked up becomes a high temperature in the case where the object to be picked up is a high temperature, an amount of heat transferred from the prism to the lens and the camera can be suppressed and the heat can be rapidly saturated, so that it is possible to suppress the heat deformation of the respective portions. Thus, the image pickup accuracy can be improved.

When the camera generates heat, the amount of heat transferred from the camera to the lens and the prism can be suppressed. Therefore, also in this case, the image pickup accuracy can be improved.

(2) It is possible that the prism and the lens are separated from each other, the lens and the camera are separated from each other, and the prism, the lens, and the camera are each supported by the base.

(3) It is possible that the prism and the lens are separated from each other, the lens and the camera are integrally joinde to each other, and the prism and the lens are supported by the base. In this case, the amount of heat transferred from the prism to the lens can be suppressed.

(4) It is preferred that a cover member is provided in at least an end portion of the prism on a light entrance hole side and cooling air is supplied to an inside of the cover member.

The tip portion of the prism is located close to the object to be picked up. Therefore, when the temperature of the object to be picked up is high, heat is easy to transfer from the object to be picked up to the prism by radiation or air conversion.

Therefore, as described above, the cover is provided in the tip portion of the prism and cooling air is supplied thereinto, so that the amount of heat from object to be picked up in which the prism receives can be suppressed. In the cover, holes are provided corresponding to the light entrance holes of the prism. When air with high-temperature in the cover is removed by suction, a cooling effect is further improved.

(5) It is preferred that a heat insulating material is provided between the base and the prism, the lens, or the camera, each of which is supported by the base.

In this case, the amount of heat transferred from the prism, the lens, or the camera, each of which is supported by the base, to the base can be suppressed. Therefore, it is possible to ease a rise in temperature of the base and to suppress a temperature-rise ratio (temperature-rise amount per unit time). Thus, a rapid change in temperature gradient of the base can be suppressed, thereby preventing the base from causing warp deformation.

As described above, the warp deformation of the base is suppressed by suppressing the amount of heat transferred from the perspective portions supported by the base to the base, so that a positional relationship among the prism, the lens, and the camera can be maintained to a normal state. Therefore, the image pickup accuracy can be further improved.

(6) It is preferred that two light entrance holes are provided at a predetermined distance from each other in a circumferential direction of the prism.

In this case, images of two objects to be picked up which are longitudinally located can be picked up without operation such as rotating of the prism. In addition, when the two objects to be picked up are alternately illuminated, the images of the two objects to be picked up can be picked up at different timings without the rotation of the prism.

(7) A substrate mounting apparatus for an electronic part according to the present invention includes:

a mounting device mounting the electronic part on a substrate;

a positional displacement detecting device detecting a positional displacement between the electronic part and the substrate before mounting of the electronic part on the substrate; and an alignment device correcting the positional displacement between the electronic part and the substrate based on a result obtained by the positional displacement detecting device, wherein the positional displacement detecting device includes the image pickup device including;

an image pickup device, comprising: a prism including a light entrance hole and a light exit hole exiting incident light by refracting the incident light from the light entrance hole and; a lens located on a light exit hole side of the prism; a camera located on an opposite side to the prism with respect to the lens; and a base that supports the prism, the lens, and the camera, the light exit hole of the prism, the lens, and the camera being arranged on the same optical axis, wherein any one or both of the prism and the lens and/or the lens and the camera are separated from each other, wherein an image of the substrate and an image of the electronic part are picked up by the camera through the prism and the lens, and the positional displacement between the electronic part and the substrate is detected based on the picked up image data.

According to the image pickup device of the present invention, the positional displacement between the substrate and the electronic part can be detected with high accuracy. Therefore, the electronic part can be mounted on the substrate with high accuracy, so that the quality of a product can be improved.

As described above, according to the image pickup device of the present invention, heat transfer among the prism, the lens, and the camera can be suppressed, so that it is possible to suppress the amount of heat deformation of the prism, the lens, or the camera. Therefore, the image of the object to be picked up can be picked up with high accuracy.

In addition, according to the substrate mounting apparatus for an electronic part in the present invention, the positional displacement between the substrate and the electronic part can be detected with high accuracy, so that the quality of a product can be improved.

DETAIL DESCRIPTION OF THE INVENTION

Hereinafter, embodiments of the present invention will be described in detail with reference to the accompanying drawings of FIGS. 1 to 7.

First Embodiment

Figure 1:
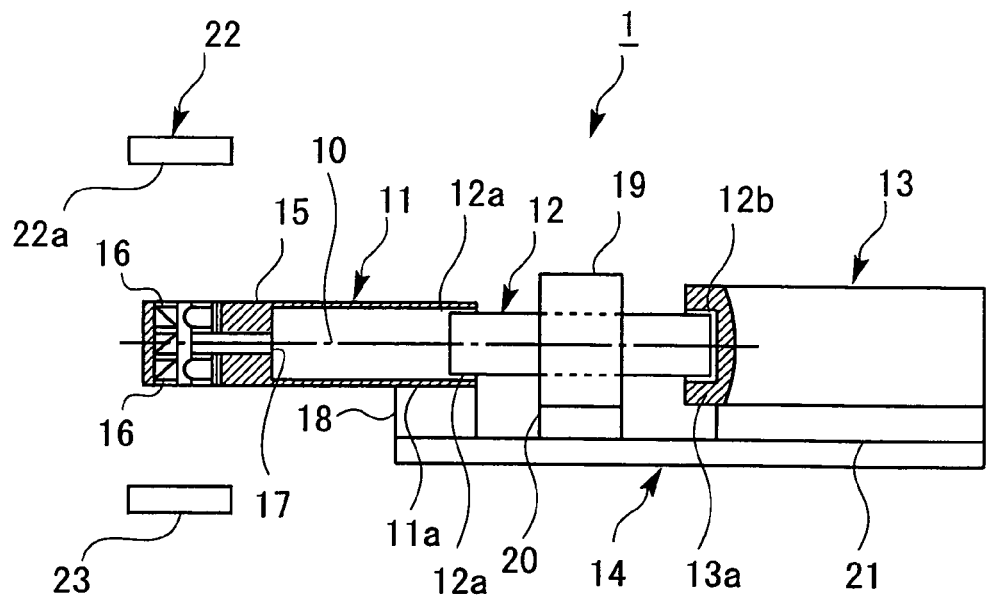
FIG. 1 is a view showing an image pickup device according to a first embodiment of the present invention.
Figure 2:
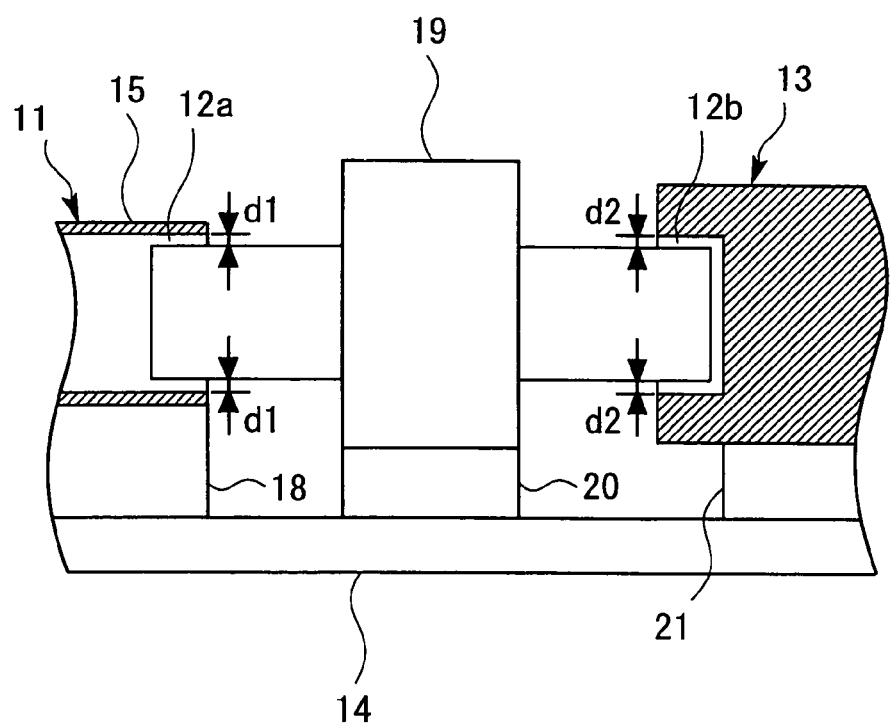
FIG. 2 is a sectional view showing a gap between a prism and a lens and a gap between the lens and a camera according to the first embodiment of the present invention.

As shown in FIG. 1, an image pickup device 1 according to the present invention includes a prism 11 having light entrance holes 16 and a light exit hole 17 for exiting the light by refracting incident light from the light entrance holes 16 and, a lens 12 located on the light exit hole 17 side of the prism 11, a camera 13 located on an opposite side to the prism 11 with respect to the lens 12, and a base 14 that supports the prism 11, the lens 12, and the camera 13.

Next, the respective constituent elements will be described. The prism 11 has a cylindrical portion 15. Two light entrance holes 16, 16 located at positions apart from each other by 180 degrees on a circumference are provided on one end side of the cylindrical portion 15.

The light exit hole 17 located on a center line (optical axis) 10 of the cylindrical portion 15 is provided inside the cylindrical portion 15 of the prism 11 in an intermediate portion thereof. The incident light from the light entrance holes 16, 16 are refracted by 90 degrees and exited from the light exit hole 17.

The prism 11 in which an end portion 11a located on an opposite side to the light entrance holes 16 is supported by the base 14 through a heat insulating material 18. For example, BESTHERMO (registered trademark in Japan), LOSSNABOARD (registered trademark in Japan), or the like can be used as each of the heat insulating material 18 and heat insulating materials 20 and 21 described later.

The lens 12 is formed in a cylindrical shape. One end portion 12a of the lens 12 is inserted into an inner portion of the prism 11. The light exited from the light exit hole 17 of the prism 11 is incident on the lens 12. A holding member 19 for holding a substantially intermediate portion of the lens 12 is provided therein. The holding member 19 is supported by the base 14 through the heat insulating material 20.

One end portion of the camera 13 on the lens 12 side is formed in a cylindrical shape. The other end 12b of the lens 12 is inserted into the one end portion of the camera 13. The light exited from the other end 12b side of the lens 12 is incident on the camera 13, so that images of objects to be picked up 22 and 23 are picked up. The camera 13 is supported by the base 14 through the heat insulating material 21.

The light exit hole 17 of the prism 11, the lens 12, and the camera 13 are arranged on the same optical axis 10.

A gap d1 (see FIG. 2) is provided between the one end portion 12a of the lens 12 and the cylindrical portion 15 of the prism 11 over the entire circumference. The prism 11 and the lens 12 are completely separated from each other, so that there is no contact portion.

A gap d2 is also provided between the camera 13 and the other end portion 12b of the lens 12 over the entire circumference. The camera 13 and the lens 12 are completely separated from each other, so that there is no contact portion.

Next, an operation of the image pickup device 1 will be described. As shown in FIG. 1, when the images of the objects to be picked up 22 and 23 which are longitudinally opposed to each other are picked up by the image pickup device 1, first, an image pickup surface 22a of one object to be picked up 22 is illuminated. An image pickup surface 23a of the other object to be picked up 23 is not illuminated and left dark.

In such a state, illumination light is reflected on only the image pickup surface 22a of the one object to be picked up 22 and incident on one light entrance hole 16 of the prism 11.

The light incident on the one light entrance hole 16 of the prism 11 is refracted by 90 degrees and exited from the light exit hole 17. Then, the light is incident on the camera 13 through the lens 12. Therefore, only the image of the image pickup surface 22a of the one object to be picked up 22 is picked up by the camera 13.

When the image of the other object to be picked up 23 is picked up, the image pickup surface 23a of the object to be picked up 23 is illuminated. The image pickup surface 22a of the object to be picked up 22 is left dark. Therefore, the image of the image pickup surface 23a of the one object to be picked up 23 is picked up by the camera 13.

As described above, according to the image pickup device 1 of the present invention, the prism 11 and the lens 12 are completely separated from each other, so that there is no contact portion. Therefore, even when the objects to be picked up 22 and 23 each have a high temperature and a temperature of the prism 11 is raised by radiation heat therefrom or air conversion heat, the heat transfer from the prism 11 to the lens 12 can be suppressed.

In addition, the lens 12 and the camera 13 are completely separated from each other, so that there is no contact portion. Therefore, even when the camera generates heat, the heat transfer from the camera 13 to the lens 12 can be suppressed.

Thus, the heat transfer among the prism 11, the lens 12, and the camera 13 is suppressed, so that non-uniformity of a temperature distribution can be eliminated. Thus, a deterioration in image pickup accuracy due to warp deformation can be suppressed.

The prism 11, the holding member 19 for the lens 12, and the camera 13 are supported by the base 14 through the heat insulating materials 18, 20, and 21. Therefore, the amount of heat transferred from the prism 11, the lens 12, and the camera 13 to the base 14 can be suppressed.

As a result, it is possible to suppress a rise in temperature of the base 14 and to reduce a temperature-rise ratio (temperature-rise amount per unit time). Thus, a rapid change in temperature gradient of the base 14 can be suppressed and the base 14 can be prevented from causing warp deformation.

When the base 14 is prevented from causing the warp deformation, the prism 11, the lens 12, and the camera 13 which are located above the base 14 are held on the same optical axis 10. Therefore, the image pickup accuracy of the camera 13 can be improved.

Second Embodiment

Figure 3:
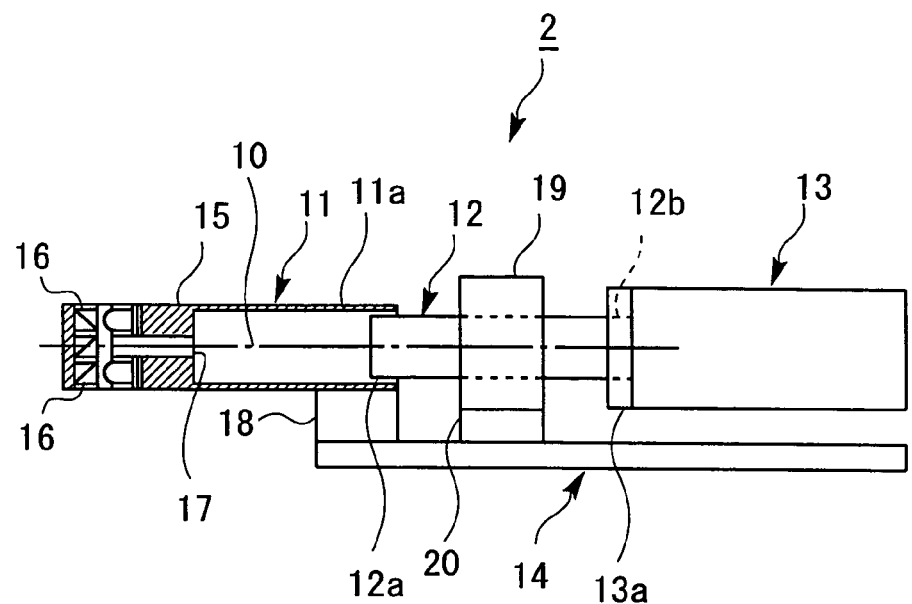
FIG. 3 is a view showing an image pickup device according to a second embodiment of the present invention.
Figure 4:
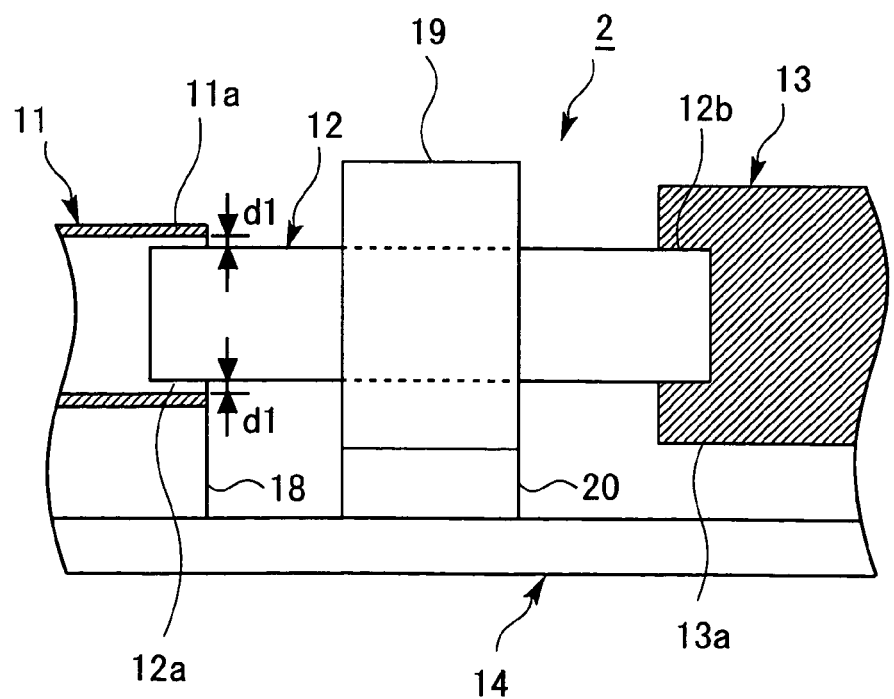
FIG. 4 is a sectional view showing a gap between a prism and a lens according to the second embodiment of the present invention.

FIGS. 3 and 4 show an image pickup device 2 according to a second embodiment of the present invention. Note that, in the description below, the same references are provided for the same portions as those in the first embodiment and the detailed description is omitted herein.

In the image pickup device 2, the gap d1 is provided between the prism 11 and the one end portion 12a of the lens 12 over the entire circumference. The prism 11 and the lens 12 are completely separated from each other. The lens 12 and the camera 13 are integrally connected with each other.

The prism 11 is supported by the base 14 through the heat insulating material 18. The lens 12 is supported by the base 14 through the heat insulating material 20. The camera 13 is indirectly supported by the base 14 through the lens 12. The image pickup device 2 also has the same operation and effect as those of the image pickup device 1 according to the first embodiment.

Third Embodiment

Figure 5:
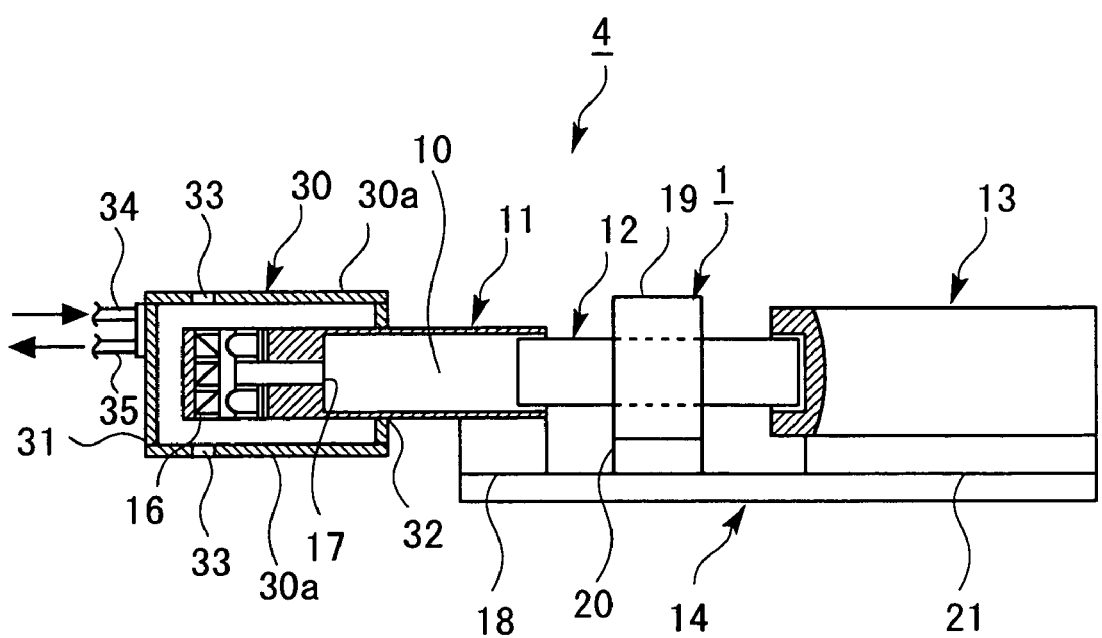
FIG. 5 is a view showing an image pickup device according to a third embodiment of the present invention.

FIG. 5 shows an image pickup device 4 according to a third embodiment of the present invention. In the image pickup device 4, a cooling cover 30 is provided in the end portion of the prism 11 in the image pickup device 1 according to the first embodiment.

The cooling cover 30 has a bottom portion 31 and is formed in a cylindrical shape. An opening portion 32 of the cooling cover 30 is fitted to the intermediate portion of the prism 11 without clearance.

Light entrance holes 33, 33 corresponding to the light entrance holes 16, 16 of the prism 11 are provided in a barrel portion 30a of the cooling cover 30. A cooling air supplying port 34 and an exhaust port 35 for removing air in the barrel portion 30a by suction are provided in the bottom portion 31 of the cooling cover 30.

In the image pickup device 4, low-temperature air is supplied to the cooling cover 30 and high-temperature air in the cooling cover 30 is removed by suction, so that a rise in temperature of the prism 11 can be suppressed. Therefore, heat deformation of the prism 11 can be suppressed, so that the image pickup accuracy can be improved.

Fourth Embodiment

Figure 6:
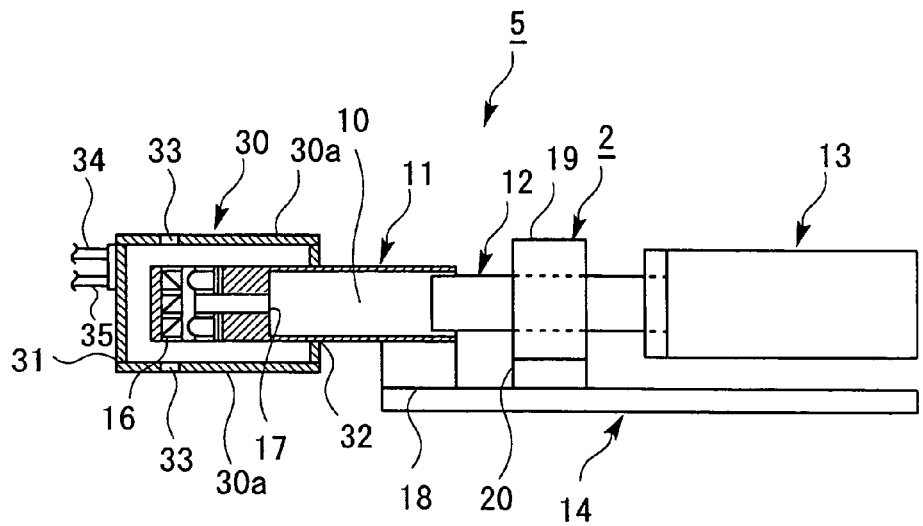
FIG. 6 is a view showing an image pickup device according to a fourth embodiment of the present invention.

FIG. 6 shows an image pickup device 5 according to a fourth embodiment of the present invention. In the image pickup device 5, the cooling cover 30 is provided in the end portion of the prism 11 of the image pickup device 2 according to the second embodiment. The image pickup device 5 also has the same operation and effect as those of the image pickup device 4 according to the fourth embodiment.

Fifth Embodiment

Figure 7:
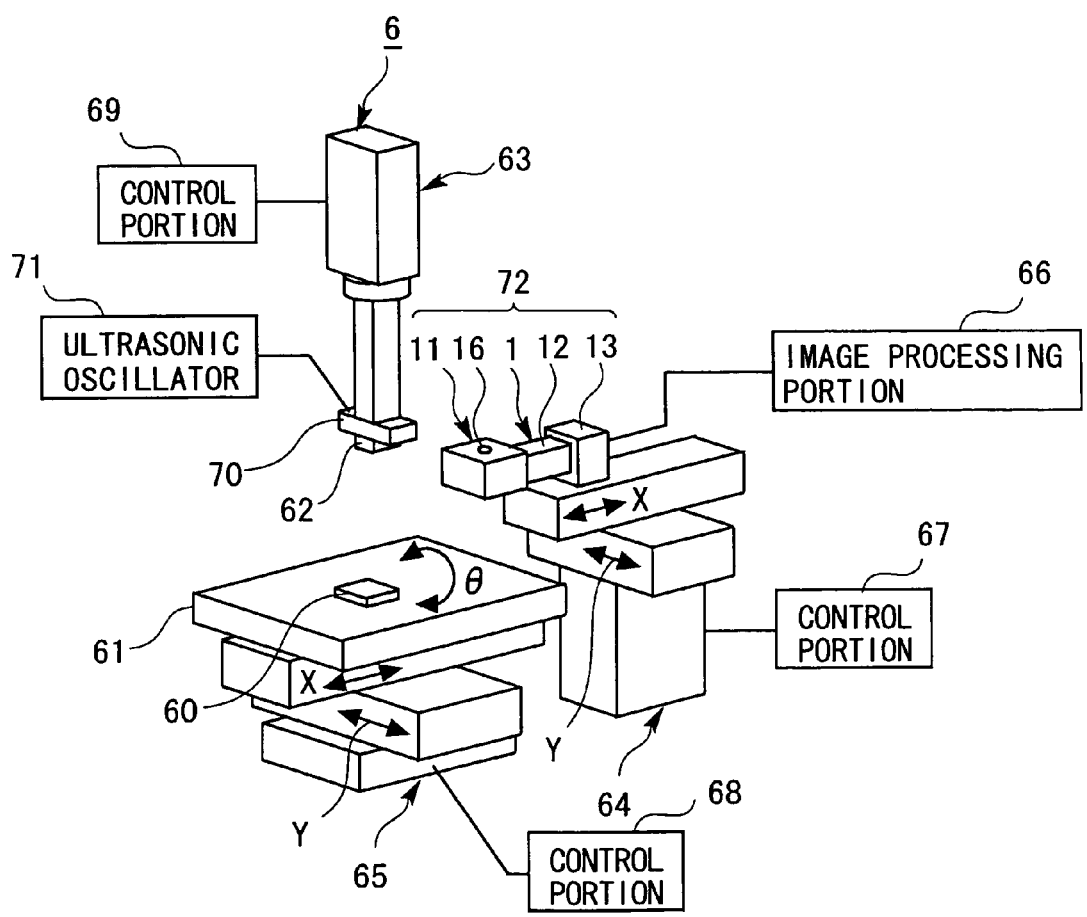
FIG. 7 is a perspective view showing a substrate mounting apparatus for an electronic part according to a fifth embodiment of the present invention.

FIG. 7 shows a substrate mounting apparatus 6 for an electronic part according to a fifth embodiment of the present invention. The substrate mounting apparatus 6 for the electronic part includes a stage 61 for holding a substrate 60 placed thereon, a mounting device 63 for mounting an electronic part 62 on the substrate 60 placed on the stage 61, a positional displacement detecting device 72 for detecting a positional displacement between the substrate 60 and the electronic part 62 located just on the substrate 60, a positional displacement detecting device moving portion 64 for moving the positional displacement detecting device 72 in X- and Y-directions, and a stage moving portion 65 for moving the stage 61 in X-, Y-, and Θ-directions based on the positional displacement detected by the positional displacement detecting device 72.

The mounting device 63 has an adsorption and ultrasonic head 70. The adsorption and ultrasonic head 70 is connected with an ultrasonic oscillator 71. The positional displacement detecting device 72 is connected with an image processing portion 66. The image pickup device 1 described in the first embodiment is provided with the positional displacement detecting device 72.

The positional displacement detecting device moving portion 64, the stage moving portion 65, and the mounting device 63 are connected with control portions 67, 68, and 69, respectively. The image processing portion 66 and the control portions 67, 68, and 69 are controlled by a main controller (not shown).

When the electronic part 62 is mounted on the substrate 60 by the substrate mounting apparatus 6 for the electronic part, the substrate 60 is placed on the stage 61 and held thereby. The electronic part 62 is adsorbed to the adsorption and ultrasonic head 70 and held thereby. The electronic part 62 is located above the substrate 60 at a predetermined position.

With such a state, the tip portion of the image pickup device 1 in the positional displacement detecting device 72 is inserted between the substrate 60 and the electronic part 62 such that the light entrance holes 16 are located between the substrate 60 and the electronic part 62. Images of predetermined marks (not shown) provided on the substrate 60 and the electronic part 62 are separately picked up at different timings by the image pickup device 1. After that, the image pickup device 1 is returned to an original position.

Next, a positional displacement between the substrate 60 and the electronic part 62 is detected based on the images related to the substrate 60 and the electronic part 62 by the image processing portion 66. The stage 61 is moved in predetermined directions based on a result obtained by the detection. Therefore, the positional displacement between the substrate 60 and the electronic part 62 is corrected. Next, the adsorption and ultrasonic head 70 moves down and the electronic part 62 is ultrasonically bonded to the substrate 60.

According to the substrate mounting apparatus 6 for the electronic part, the amount of heat deformation of the image pickup device 1 in the positional displacement detecting device 72 is small and the image pickup accuracy is high, so that the positional displacement between the substrate 60 and the electronic part 62 can be detected with high accuracy.

Therefore, the substrate 60 and the electronic part 62 can be aligned with each other with high accuracy regardless of whether the adsorption and ultrasonic head 70 of the mounting device 63 and the stage 61 are heated or not. Thus, the quality of a product can be improved and limited conditions related to operation and setting of the substrate mounting apparatus 6 for the electronic part can be eased.

A deterioration in alignment accuracy between the substrate 60 and the electronic part 62 due to a change in temperature is hardly caused, so that it is possible to stabilize high-accuracy alignment for a long time.

In this embodiment, the image pickup device 1 according to the first embodiment is used for the positional displacement detecting device 72. The image pickup devices 2 to 5 according to the second embodiment to the fifth embodiment can be provided for the positional displacement detecting device 72.

In this embodiment, the ultrasonic bonding is performed. A mounting apparatus for performing thermocompression bonding can be also used.

What is claimed is:

1. An image pickup device, comprising:
   a prism including a cylindrical portion having a light entrance hole and a light exiting hole;
   a lens located on a light exiting hole side of the cylindrical portion, one end of the lens being inserted into an inner portion of the cylindrical portion;
   a camera located on an opposite side to the prism with respect to the lens; and
   a base that supports at least the prism and the lens, the light exiting hole of the prism, the lens and the camera being arranged on the same optical axis,
   wherein the prism and the lens are separated from each other by a gap between an outer surface of the lens and a corresponding inner surface of the cylindrical portion, and
   wherein the base is formed in a shape of a bar and a major axis of the bar shape extends in a direction parallel to the optical axis.

2. The image pickup device according to claim 1, wherein the other end portion of the lens is inserted into the camera,
   the lens and the camera are separated from each other by a gap between the outer surface of the other end portion of the lens and a corresponding inner surface of the camera, and
   the prism, the lens, and the camera are each supported by the base.

3. The image pickup device according to claim 1, wherein the lens and the camera are integrally joined to each other, and the prism and the lens are supported by the base.

4. The image pickup device according to claim 1, wherein a cover member is provided for at least a tip portion of the prism on a light entrance hole side and cooling air is supplied to an inside of the cover member.

5. The image pickup device according to claim 1, wherein a heat insulating material is provided between the base and the prism, the lens, or the camera, each of which is supported by the base.

6. The image pickup device according to claim 1, wherein two light entrance holes are provided at a specified distance from each other in a circumferential direction of the prism.

7. The image pickup device according to claim 1, wherein the outer surface is an entire circumferential surface of the end portion of lens inserted into the prism, and there is no contact between the outer surface and the inner surface of the prism.

8. The image pickup device according to claim 1, wherein the outer surface is entire circumferential surface of the end portion of lens inserted into the prism, and the gap between the outer surface and the inner surface of the prism is uniform.

9. The image pickup device according to claim 2, wherein the outer surface of the other end portion is an entire circumferential surface of the other end portion of lens that is inserted into the camera, and there is no contact between the outer surface of the other end portion and the inner surface of the camera.

10. A substrate mounting apparatus for an electronic part having an image pickup device, comprising:
    a mounting device mounting the electronic part on a substrate;
    a positional displacement detecting device detecting a positional displacement between the electronic part and the substrate before mounting of the electronic part on the substrate; and
    an alignment device correcting the positional displacement between the electronic part and the substrate based on a result obtained by the positional displacement detecting device, wherein:
    the positional displacement detecting device includes an image pickup device including:
    a prism including a cylindrical portion having a light entrance hole and a light exiting hole;

a lens located on a light exiting hole side of the cylindrical portion, one end of the lens being inserted into an inner portion of the cylindrical portion;

a camera located on an opposite side to the prism with respect to the lens; and a base that supports at least the prism and the lens, the light exiting hole of the prism, the lens and the camera being arranged on the same optical axis, wherein the prism and the lens are separated from each other by a gap between an outer surface of the lens and a corresponding inner surface of the cylindrical portion, wherein the base is formed in a shape of a bar and a major axis of the bar shape extends in a direction parallel to the optical axis, wherein an image of the substrate and an image of the electronic part are obtained by the camera through the prism and the lens, and the positional displacement between the electronic part and the substrate is detected based on data of the obtained images.

* * * * *